US011109376B2

(12) United States Patent
Kadous et al.

(10) Patent No.: US 11,109,376 B2
(45) Date of Patent: Aug. 31, 2021

(54) STRUCTURED CHANNEL RASTERS FOR UNLICENSED SPECTRUM

(71) Applicant: QUALCOMM Incorporated, San Diego, CA (US)

(72) Inventors: Tamer Adel Kadous, San Diego, CA (US); Heechoon Lee, San Diego, CA (US); Tingfang Ji, San Diego, CA (US); Durga Prasad Malladi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 14/844,889

(22) Filed: Sep. 3, 2015

(65) Prior Publication Data
US 2016/0088625 A1    Mar. 24, 2016

Related U.S. Application Data

(60) Provisional application No. 62/053,751, filed on Sep. 22, 2014, provisional application No. 62/053,749, filed on Sep. 22, 2014.

(51) Int. Cl.
*H04W 72/04* (2009.01)
*H04W 16/14* (2009.01)
(Continued)

(52) U.S. Cl.
CPC ..... *H04W 72/0453* (2013.01); *H04L 27/0006* (2013.01); *H04W 16/14* (2013.01);
(Continued)

(58) Field of Classification Search
CPC .... H04L 27/0006; H04L 5/001; H04W 16/14; H04W 48/16; H04W 72/0453; H04W 72/082; H04W 84/042; H04W 84/12
See application file for complete search history.

(56) References Cited

U.S. PATENT DOCUMENTS

2005/0075125 A1* 4/2005 Bada ............... H04W 48/20
455/525
2009/0042566 A1   2/2009 Brandt
(Continued)

FOREIGN PATENT DOCUMENTS

EP     1 906 686 A1   4/2008
JP    2013535936 A    9/2013
(Continued)

OTHER PUBLICATIONS

International Search Report and Written Opinion—PCT/US2015/048524—ISA/EPO—dated Dec. 21, 2015. (15 total pages).
(Continued)

*Primary Examiner* — Omer S Mian
*Assistant Examiner* — Bao G Nguyen
(74) *Attorney, Agent, or Firm* — Liem T. Do

(57) ABSTRACT

Techniques for structured channel rasters for unlicensed spectrum are described. In an aspect, a first channel raster is identified, where the first channel raster is determined from a set of carrier frequencies and is used over an unlicensed or shared spectrum for a wireless wide area network (WWAN). The first channel raster is aligned with a second channel raster that is used over the unlicensed spectrum for a wireless local area network (WLAN). A frequency scanning may be performed by a user equipment (UE) or a network entity over the unlicensed spectrum for the WWAN using the first channel raster. In an aspect, the first channel raster is used over the unlicensed spectrum for the WWAN supported by the user equipment (UE) or the network entity.

30 Claims, 7 Drawing Sheets

(51) Int. Cl.
*H04L 27/00* (2006.01)
*H04W 84/04* (2009.01)
*H04W 84/12* (2009.01)
*H04L 5/00* (2006.01)
*H04W 48/16* (2009.01)
*H04W 72/08* (2009.01)

(52) U.S. Cl.
CPC .............. *H04L 5/001* (2013.01); *H04W 48/16* (2013.01); *H04W 72/082* (2013.01); *H04W 84/042* (2013.01); *H04W 84/12* (2013.01)

(56) References Cited

U.S. PATENT DOCUMENTS

| | | | |
|---|---|---|---|
| 2013/0143502 A1* | 6/2013 | Kazmi | H04W 88/06 455/62 |
| 2013/0176934 A1 | 7/2013 | Malladi et al. | |
| 2013/0176952 A1* | 7/2013 | Shin | H04L 5/0044 370/329 |
| 2013/0308481 A1* | 11/2013 | Kazmi | H04W 24/02 370/252 |
| 2014/0044105 A1 | 2/2014 | Bontu et al. | |
| 2015/0043491 A1* | 2/2015 | Eng | H04W 16/14 370/329 |
| 2016/0301504 A1* | 10/2016 | Toskala | H04W 16/14 |

FOREIGN PATENT DOCUMENTS

| | | |
|---|---|---|
| WO | WO-2012/021098 A1 | 2/2012 |
| WO | 2013103754 | 7/2013 |
| WO | 2014091527 A1 | 6/2014 |

OTHER PUBLICATIONS

Qualcomm Incorporated: "Channelization and Raster for 5GHz Unlicensed Spectrum", 3GPP Draft, R4-154648 LAA_CHANNELRASTER, 3rd Generation Partnership Project (3GPP), Mobile Competence Centre; 650, Route Des Lucioles, F-06921 Sophia-Antipolis Cedex, France, vol. RAN WG4, No. Beijing, China; Aug. 24, 2015-Aug. 28, 2015, Aug. 17, 2015 (Aug. 17, 2015), pp. 1-4, XP050995319, Retrieved from the Internet: URL: http://www.3gpp.org/ftp/tsg_ran/WG4_Radio/TSGR4_76/Docs/ [retrieved on Aug. 17, 2015].
Stevenson C.R., et al., "IEEE P802.22: Functional Requirements for the 802.22 WRAN Standard", IEEE Mentor, Sep. 2005 (Sep. 29, 2005), pp. 1-49, XP055027519, Retrieved from the Internet: URL: http://www.ieee802.org/22/ [retrieved on May 16, 2012].
Stevenson C.R., et al., "Functional Requirements for the 802.22 WRAN Standards", (WK3C Wireless LLC), Dec. 9, 2006, Draft WRAN Rqmts Doc, IEEE 802.22-05/0007r47, IEEE, URL:https://mentor.ieee.org/802.22/dcn/05/22/05/0007-47/0000- draft-wran-rqmts-doc.doc, pp. 1, 16, Section 13.

* cited by examiner

STRUCTURED CHANNEL RASTERS FOR UNLICENSED SPECTRUM

CLAIM OF PRIORITY UNDER 35 U.S.C § 119

The present application for patent claims priority to U.S. Provisional Application No. 62/053,751 entitled "STRUCTURED CHANNEL RASTERS FOR UNLICENSED SPECTRUM" filed Sep. 22, 2014, and U.S. Provisional Application No. 62/053,749 entitled "STRUCTURED CHANNEL RASTERS FOR UNLICENSED SPECTRUM" filed Sep. 22, 2014, both of which are assigned to the assignee hereof and hereby expressly incorporated herein by reference.

BACKGROUND

Aspects of this disclosure relate generally to telecommunications, and more particularly to structured channel rasters for unlicensed spectrum and the like.

A wireless communication network may be deployed to provide various types of services (e.g., voice, data, multimedia services, etc.) to users within a coverage area of the network. In some implementations, one or more network entities (e.g., corresponding to different cells) provide wireless connectivity for user equipment (UEs) (e.g., cell phones) that are operating within the coverage of the network entity(s). In some implementations, peer devices provide wireless connectively for communicating with one another.

Communication between devices in a wireless communication network may be subject to interference. Emissions of radio frequency (RF) energy in an unlicensed spectrum may interfere with reception of signals in the same spectrum. For example, a Long Term Evolution (LTE) signal communicated in an unlicensed RF band that is also being used by Wi-Fi may experience significant interference from Wi-Fi signals.

In some instances, LTE may use a pre-configured channel raster when performing frequency scanning. This may be problematic when LTE is being used in a very wide unlicensed spectrum with Wi-Fi, such as a 5 GHz unlicensed spectrum. Some of the issues that may arise include having a search space (hypotheses) that is too large and/or consuming too many evolved UMTS Terrestrial Radio Access (E-UTRA) Absolute Radio Frequency Channel Numbers (EARFCNs) (e.g., carrier frequency signaling) in signaling space. Accordingly, it may be desirable to consider different channel rasters for LTE deployment in unlicensed spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present method relates to frequency scanning in either a user equipment (UE) or a network entity. The described aspects include identifying a first channel raster determined from a set of carrier frequencies, wherein the first channel raster is used over an unlicensed spectrum for a wireless wide area network (WWAN), and wherein the first channel raster is aligned with a second channel raster being used over the unlicensed spectrum for a wireless local area network (WLAN). The described aspects further include performing the frequency scanning over the unlicensed spectrum for the WWAN using the first channel raster.

In another aspect, a computer-readable medium storing computer executable code relates to frequency scanning in either a UE or a network entity. The described aspects include code for identifying a first channel raster determined from a set of carrier frequencies, wherein the first channel raster is used over an unlicensed spectrum for a WWAN supported by the UE, and wherein the first channel raster is aligned with a second channel raster being used over the unlicensed spectrum for a WLAN. The described aspects further include code for performing the frequency scanning over the unlicensed spectrum for the WWAN using the first channel raster.

In a further aspect, an apparatus relates to frequency scanning in either a UE or a network entity. The described aspects include means for identifying a first channel raster determined from a set of carrier frequencies, wherein the first channel raster is used over an unlicensed spectrum for a WWAN, and wherein the first channel raster is aligned with a second channel raster being used over the unlicensed spectrum for a WLAN. The described aspects further include means for performing the frequency scanning over the unlicensed spectrum for the WWAN using the first channel raster.

In another aspect, an apparatus relates to frequency scanning in either a UE or a network entity. The described aspects include a transceiver, a memory configured to store data, and one or more processors communicatively coupled with the transceiver and the memory via at least one bus, wherein the one or more processors and the memory are configured to identify a first channel raster determined from a set of carrier frequencies, wherein the first channel raster is used over an unlicensed spectrum for a WWAN supported by the UE, and wherein the first channel raster is aligned with a second channel raster being used over the unlicensed spectrum for a WLAN. The described aspects further include performing, via the transceiver, the frequency scanning over the unlicensed spectrum for the WWAN using the first channel raster.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1A:
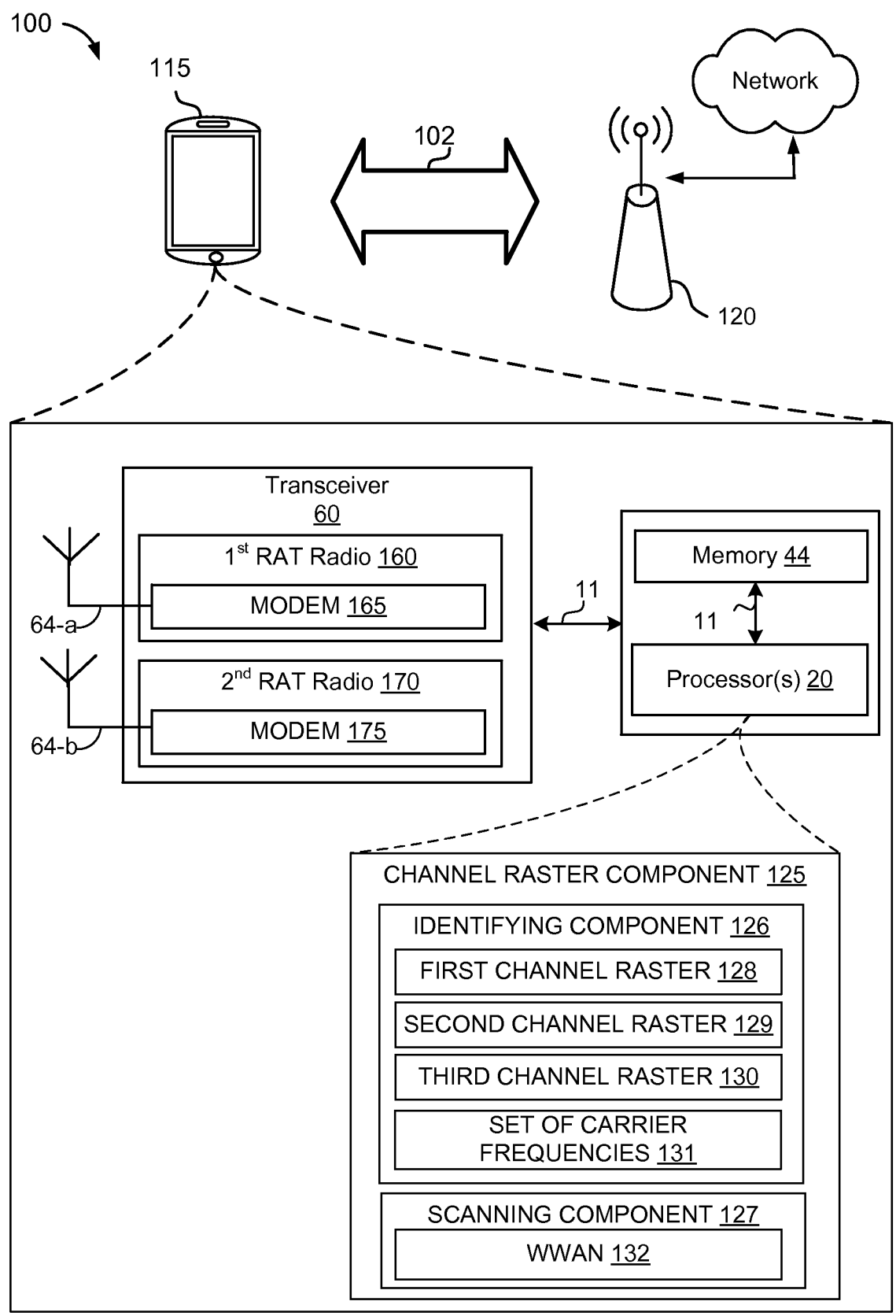
FIGS. 1A and 1B are schematic diagrams of a communication network including aspects of a UE and a network entity, respectively, that may be configured for frequency scanning in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to structured channel rasters for unlicensed or shared spectrum. In an aspect, a channel raster is the steps or frequencies that can be used by a communication device. In particular, for example, when using LTE in an unlicensed spectrum, a 100 kHz channel raster may be used. This approach, however, may be problematic for a wide range spectrum such as 5 GHz unlicensed band because the search space (e.g., the number of hypotheses used for the search) may be too large, and/or because the frequency scanning based on such channel raster may consume too many EARFCNs (e.g., carrier frequency signaling) in signaling space. Accordingly, it may be desirable to consider different channel rasters, structured channel rasters, for LTE deployment in unlicensed spectrum.

In one aspect, considering that an LTE deployment of interest in unlicensed spectrum is 20 MHz (although other bandwidths may also be used), one approach for structured channel rasters may be to align the LTE channel raster with 20 MHz Wi-Fi channel, which is one structured channel raster every 20 MHz. In addition to these carrier frequencies, EARFCNs (f1, f2 (=f1+20 MHz), f3 (=f1+40 MHz), . . . ), it may be desirable to introduce additional carrier frequencies around those frequencies. For example, around a first frequency (f1) used in a Wi-Fi channel raster, other frequencies such as f1-200 kHz, f1-100 kHz, f1, f1+100 kHz, f1+200 kHz, and so on are introduced for the LTE channel raster. Similarly, around a second frequency (f2) used in the Wi-Fi channel raster, other frequencies such as f2-200 kHz, f2-100 kHz, f2, f2+100 kHz, f2+200 kHz, and so on are introduced for the LTE channel raster. This is to allow aligning the subcarriers for the case of intra-band contiguous carrier aggregation (CA) where the carrier spacing is a multiple of 300 kHz.

Accordingly, in some aspects, the present methods and apparatuses may provide an efficient solution, as compared to current solutions, by adjusting the channel rasters for LTE deployment in the unlicensed spectrum. In other words, in the present aspects, modified channel rasters may be used to scan for frequencies in the unlicensed spectrum. As such, the present aspects provide one or more mechanisms for identifying a first channel raster determined from a set of carrier frequencies, wherein the first channel raster is used over an unlicensed spectrum for a WWAN supported by the UE, and wherein the first channel raster is aligned (e.g., a certain number of frequencies are the same) with a second channel raster being used over the unlicensed spectrum for a WLAN. In an aspect, WWAN refers to, for example, cellular networks of which an LTE network is an example, although other types of cellular or similar networks may also be considered WWANs. Moreover, the present aspects also provide one or more mechanisms for performing the frequency scanning over the unlicensed spectrum for the WWAN using the first channel raster.

With this reduced set of channel numbers due to adjusting the size of the channel rasters, the search space by a network entity (e.g., network entity 120 in FIG. 1B) or by a UE (e.g., UE 115 in FIG. 1A) can be significantly reduced and the EARFCN spaces can be saved accordingly. The newly proposed EARFCN is shown in Table 1 below. Based on this revised proposal, the EARFCN is reduced as compared to the previous proposal. Band number 125 corresponds to the band for Unlicensed National Information Infrastructure 1 (UNII-1) spectrum (e.g., 5150-5250 MHz). Moreover, band number 127 corresponds to the band for UNII-3 spectrum (e.g., 5725-5850 MHz).

TABLE 1

EARFCN and Band numbers

| Band Number | $F_{DL\_low}$ [MHz] | $N_{Offs-DL}$ | Range of $N_{DL}$ |
|---|---|---|---|
| 125[1] | 5159.8 | 64835 | 64835-64859 |
| 127[2] | 5744.8 | 64975 | 64975-64999 |

With regard to band number 125, there is no Wi-Fi channel at 5160 MHz. The first 20 MHz Wi-Fi channel starts at 5180 MHz. Therefore, the first 5 EARFCNs (64835-64839) for band 125 do not correspond to the 20 MHz Wi-Fi channel. Furthermore, regarding band number 127, there is no EARFCN corresponding to the lower edge (5725-5735 MHz) and the upper edge (5835-5850) of UNII-3 due to the lack of 20 MHz channel availability. The EARFCN may be calculated using the $F_{DL\_low}$ [MHz], $N_{Offs-DL}$, Range of $N_{DL}$ based on one of the new expressions (1) and/or (2), described below.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1B:
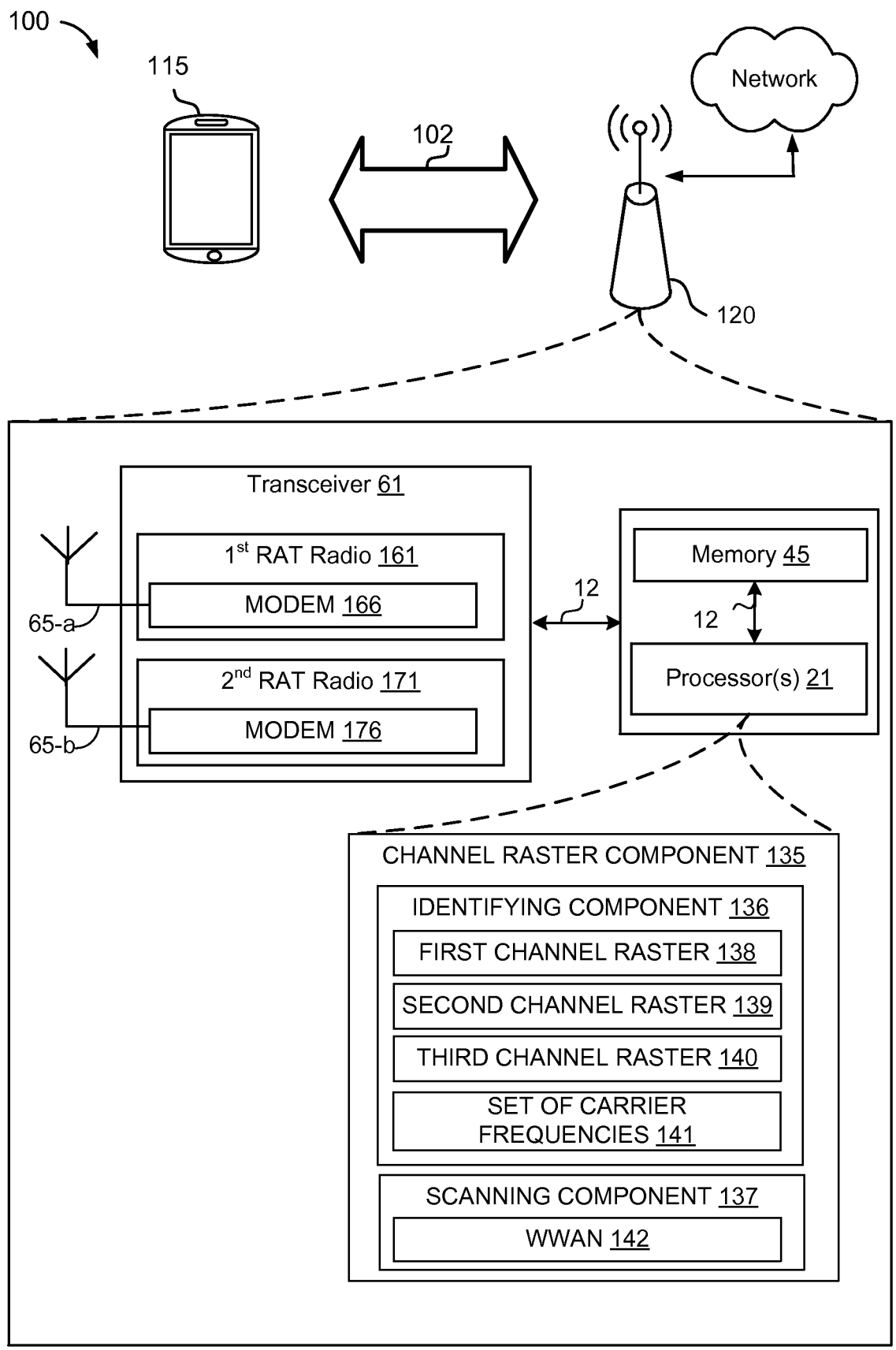

Referring to FIGS. 1A and 1B, in an aspect, a wireless communication system 100 includes at least one user equipment (UE) 115 in communication coverage of at least one network entity 120. The UE 115 may communicate with network via network entity 120. In an example, UE 115 may transmit and/or receive wireless communication to and/or from network entity 120 via one or more communication channels 102, which may include an uplink communication channel (or simply uplink channel) and a downlink communication channel (or simply downlink channel), such as but not limited to an uplink data channel and/or downlink data channel. Such wireless communications may include, but are not limited to, data, audio and/or video information. In an aspect, UE 115 and/or network entity 120 may be configured to perform frequency scanning over the unlicensed spectrum for the WWAN using one or more structured channel rasters.

Referring to FIG. 1A, in accordance with the present disclosure, UE 115 may include a memory 44, one or more processors 20 and a transceiver 60. The memory, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor. Additionally or alternatively, the one or more processors 20 may include a channel raster component 125 for carrying out one or more methods or procedures described herein. The channel raster component 125 may comprise hardware, firmware, and/or software and may be configured to execute code or perform instructions stored in a memory (e.g., a computer-readable storage medium).

In some examples, the UE 115 may include the memory 44, such as for storing data used herein and/or local versions of applications or channel raster component 125 and/or one or more of its subcomponents being executed by the one or more processors 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium (e.g., a non-transitory medium) that stores computer-executable code. The computer-executable code may define one or more operations or functions of channel raster component 125 and/or one or more of its subcomponents, and/or data associated therewith. The computer-executable code may define these one or more operations or functions when UE 115 is operating processor 20 to execute channel raster component 125 and/or one or more of its subcomponents. In some examples, the UE 115 may further include a transceiver 60 for transmitting and/or receiving one or more data and control signals to/from the network via network entity 120. The transceiver 60 may comprise hardware, firmware, and/or software and may be configured to execute code or perform instructions stored in a memory (e.g., a computer-readable storage medium). The transceiver 60 may include a $1^{st}$ RAT radio 160 comprising a modem 165, and a $2^{nd}$ RAT radio 170 (e.g., LTE radio) comprising a modem 175. In an aspect, a wireless local area network (WLAN) may correspond to the $1^{st}$ RAT (e.g., WLAN radio), and a wireless wide area network (WWAN) may correspond to the $2^{nd}$ RAT (e.g., WWAN radio). The $1^{st}$ RAT radio 160 and $2^{nd}$ RAT radio 170 may utilize one or more antennas 64 for transmitting signals to and receiving signals from the network entity 120. The transceiver 60 may include a $1^{st}$ RAT radio 160 comprising a modem 165, and a $2^{nd}$ RAT radio 170 (e.g., LTE radio) comprising a modem 175. The $1^{st}$ RAT radio 160 and 2nd RAT radio 170 may utilize one or more antennas 64 for transmitting signals to and receiving signals from the network entity 110 and/or 111.

When the UE 115 (or any other devices in the system 100) uses a first RAT to communicate on a given resource, this communication may be subjected to interference from nearby devices that use a second RAT to communicate on that resource. For example, communication by the network entity 120 via LTE using second RAT radio 170 on a particular unlicensed radio frequency (RF) band may be subject to interference from Wi-Fi devices operating on that band. For convenience, LTE on an unlicensed RF band may be referred to herein as LTE/LTE Advanced in unlicensed spectrum, or simply LTE in the surrounding context.

When network entity 120 sends downlink transmissions to UE 115, assigned resources on the downlink frequency band are utilized. For example, the network entity 120 operating in an unlicensed or shared RF band may be assigned an interlace of radio bearers (RBs) in which downlink data transmissions may be sent. In order to avoid collisions with other network entities in a contention based downlink channel, the network entity 120 may send a preamble. For convenience, LTE on an unlicensed RF band may be referred to herein as LTE/LTE Advanced in unlicensed spectrum, LTE-license assisted access (LTE-LAA), or simply LTE in the surrounding context. Moreover, LTE operating over an unlicensed spectrum may refer to the use or modification of LTE to operate in a contention-based communication system that uses a shared medium.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone)

and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In a blended radio environment such as system 100, different RATs may make use of different channels at different times. Because different RATs are sharing the spectrum and operating partly independently of others, access to one channel may not imply access to another channel. Accordingly, a device capable of transmitting using multiple channels may need to determine whether each channel is available before transmitting. In order to increase bandwidth and throughput, it may be beneficial in some situations to wait for an additional channel to become available rather than transmitting using currently available channel(s).

Similarly, with regard to FIG. 1B, network entity 120 may include a memory 45, one or more processors 21 and a transceiver 61. Memory 45, one or more processors 21 and a transceiver 61 may operate in the same and/or similar manner to memory 44, one or more processors 20 and a transceiver 60 of UE 115 described in FIG. 1A. Furthermore, memory 45, one or more processors 21 and a transceiver 61 may operate the same and/or similar components including, but not limited to a 1$^{st}$ RAT radio 161 with modem 166, a 2$^{nd}$ RAT radio 171 with modem 176, and antennas 65. Moreover, memory 45, one or more processors 21 and the transceiver 61 may communicate internally via a bus 12. Furthermore, memory 45, one or more processors 21 and the transceiver 61 communicating internally via a bus 12 may be configured to perform frequency scanning over the unlicensed spectrum for the WWAN using one or more structured channel rasters.

Referring back to FIG. 1A, as noted above, in an aspect, system 100 may include UE 115, and which UE 115 may include a channel raster component 125 having an identifying component 126 and a scanning component 127. For example, the identifying component 126 may include means for identifying a first channel raster 128 determined from a set of carrier frequencies 131. In an aspect, the first channel raster 128 is used over an unlicensed spectrum for WWAN support component 132 (hereinafter referred to as WWAN 132) used to support channel raster operations and/or functions associated with WWAN supported by the UE 115. In another aspect, the first channel raster 128 is aligned with a second channel raster 129 (see e.g., Wi-Fi channel raster in FIG. 4) being used over the unlicensed spectrum for a WLAN (e.g., Wi-Fi network). The first channel raster 128 may correspond to a first channel raster pattern for WWAN 132 using carrier aggregation (see e.g., LTE over unlicensed spectrum using carrier aggregation (CA) Pattern 1 408 in FIG. 4). In another aspect, the first channel raster 128 may correspond to a first channel raster pattern for WWAN 132 using carrier aggregation. Furthermore, a third channel raster 130 may be determined from the set of carrier frequencies 131 and used over the unlicensed spectrum for the WWAN 132 supported by the UE 115. The third channel raster 130 may correspond to a second channel raster pattern for WWAN 132 using carrier aggregation (see e.g., LTE over unlicensed spectrum using CA Pattern 2 412 in FIG. 4) that is different from the first channel raster pattern. In some aspects, the first channel raster pattern may be offset from the second channel raster pattern. The various channel rasters described herein for use in LTE over unlicensed spectrum may be referred to as structured channel rasters.

In another aspect, the identifying component 126 may be configured to handle the first channel raster 128 when the set of carrier frequencies 131 includes multiple subsets of carrier frequencies, where each subset is aligned to a carrier frequency in the second channel raster 129, where each subset has a same number of carrier frequencies as each other subset, where the carrier frequencies within each subset are equally spaced (e.g., in frequency), and where the first raster channel 128 is determined from the multiple subsets of carrier frequencies. For example, in an aspect, the number of carrier frequencies in a subset may be five (5) and the spacing between carrier frequencies in a subset is 100 kHz. However, other numbers of carrier frequencies (e.g., 3, 7, 9, etc.) may also be used, as well a different frequency spacing.

In an aspect, such as for downlink operations, the first channel raster 128 includes carrier frequencies determined based on the following expression:

$$F_{DL} = \\ F_{DL\_low} + 20 \times \text{floor}\left(\frac{N_{DL} - N_{Offs\_DL}}{5}\right) + 0.1 \times \text{rem}(N_{DL} - N_{Offs\_DL}, 5) \quad (1)$$

where $F_{DL}$ corresponds to the downlink carrier frequency, $F_{DL\_low}$ corresponds to the lowest frequency of the downlink operating band, $N_{DL}$ corresponds to a respective downlink E-UTRA Absolute Radio Frequency Channel Number (EARFCN), and $N_{offs\_DL}$ corresponds to the offset used for calculating downlink EARFCN. In this aspect, the number of carrier frequencies in a subset is set to five (5), but other numbers of carrier frequencies (e.g., 3, 7, 9, etc.) may be used based on the configuration. Furthermore, the expression calculates the floor of based on $N_{DL}$ and $N_{Offs\_DL}$, wherein the floor function rounds each element x (e.g., floor(x), where x corresponds to the element) to a nearest integer less than or equal to the element (i.e., the next smaller integer). Moreover, the rem function calculates the remainder after division of the elements within the function (e.g., rem(x, y), where x and y correspond to the elements). In this aspect, the number of carrier frequencies in a subset used by the rem function is set to five (5), but other numbers of carrier frequencies may be used. Additionally, the expression calculates $F_{DL}$ by multiplying the floor function by 20 MHz and the rem function by 0.1 MHz. However, these constants may be configurable.

In another aspect, such as for uplink operations, the first channel raster 128 includes carrier frequencies determined based on the following expression:

$$F_{UL} = \qquad (2)$$
$$F_{UL\_low} + 20 \times \text{floor}\left(\frac{N_{UL} - N_{Offs\_UL}}{5}\right) + 0.1 \times \text{rem}(N_{UL} - N_{Offs\_UL}, 5)$$

where $F_{UL}$ corresponds to the uplink carrier frequency, $F_{UL\_low}$ corresponds to the lowest frequency of the uplink operating band, $N_{UL}$ corresponds to a respective uplink EARFCN, and $N_{Offs\_UL}$ corresponds to the offset used for calculating uplink EARFCN. In this aspect, the number of carrier frequencies in a subset is set to five (5), but other numbers of carrier frequencies (e.g., 3, 7, 9, etc.) may be used based on the configuration. Furthermore, the expression calculates the floor of based on $N_{UL}$ and $N_{offs\_DL}$, wherein the floor function rounds each element x (e.g., floor(x), where x corresponds to the element) to a nearest integer less than or equal to the element (i.e., the next smaller integer). Moreover, the rem function calculates the remainder after division of the elements within the function (e.g., rem(x, y), where x and y correspond to the elements). In this aspect, the number of carrier frequencies in a subset used by the rem function is set to five (5), but other numbers of carrier frequencies may be used. Additionally, the expression calculates $F_{UL}$ by multiplying the floor function by 20 MHz and the rem function by 0.1 MHz. However, these constants may be configurable.

In an aspect, scanning component 127 may include means for performing the frequency scanning over the unlicensed spectrum for the WWAN 132 using the first channel raster 128. For example, scanning component 127 may configure $2^{nd}$ RAT radio 170 in transceiver 60 to scan for WWAN 132 over the unlicensed spectrum using the first channel raster 128. In this aspect, $2^{nd}$ RAT radio 170 may be associated with a WWAN (e.g., WWAN 132) over the unlicensed spectrum and may utilize one or more antennas 64 (e.g., antenna 64-*b*) for transmitting signals to and receiving signals from the network entity 120 over communication channel 102.

Referring back to FIG. 1B, in an aspect, network entity 120 may include a channel raster component 135 having an identifying component 136 and a scanning component 137. For example, identifying component 136 may include means for identifying a first channel raster 138 determined from a set of carrier frequencies 141. The first channel raster 138 may be used over an unlicensed spectrum for WWAN support component 142 (hereinafter referred to as WWAN 142) used to support channel raster operations and/or functions associated with WWAN supported by the network entity 120, and the first channel raster 138 may be aligned with a second channel raster 139 (see e.g., Wi-Fi channel raster in FIG. 4) being used over the unlicensed spectrum for a WLAN (e.g., Wi-Fi network). The first channel raster 138 may correspond to a first channel raster pattern for WWAN 142 using carrier aggregation (see e.g., LTE in unlicensed spectrum using CA Pattern 1 408 in FIG. 4). In another aspect, the first channel raster 138 may correspond to a first channel raster pattern for WWAN 142 using carrier aggregation. Further, a third channel raster 140 may be determined from the set of carrier frequencies 141 and used over the unlicensed spectrum for the WWAN 142 supported by the network entity 120, and the third channel raster 140 may correspond to a second channel raster pattern for WWAN 142 using carrier aggregation (see e.g., LTE in unlicensed spectrum using CA Pattern 2 412 in FIG. 4) that is different from the first channel raster pattern. In some aspects, the first channel raster pattern may be offset from the second channel raster pattern. The various channel rasters described herein for use in LTE over unlicensed spectrum may be referred to as structured channel rasters.

In another aspect, the identifying component 136 may be configured to handle the first channel raster 138 when the set of carrier frequencies 141 includes multiple subsets of carrier frequencies, each subset being aligned to a carrier frequency in the second channel raster 139, with each subset having a same number of carrier frequencies as each other subset, the carrier frequencies within each subset being equally spaced (e.g., in frequency), and the first channel raster 138 being determined from the multiple subsets of carrier frequencies. In a non-limiting example, the number of carrier frequencies in a subset is five (5) and the spacing between carrier frequencies in a subset is 100 kHz. However, other numbers of carrier frequencies (e.g., 3, 7, 9, etc.) may also be used, as well a different frequency spacing.

In another aspect, such as for downlink operations, the first channel raster includes carrier frequencies determined based on expression (1), as described above.

In another aspect, such as for uplink operations, the first channel raster 128 includes carrier frequencies determined based on expression (2), as described above.

Figure 2:
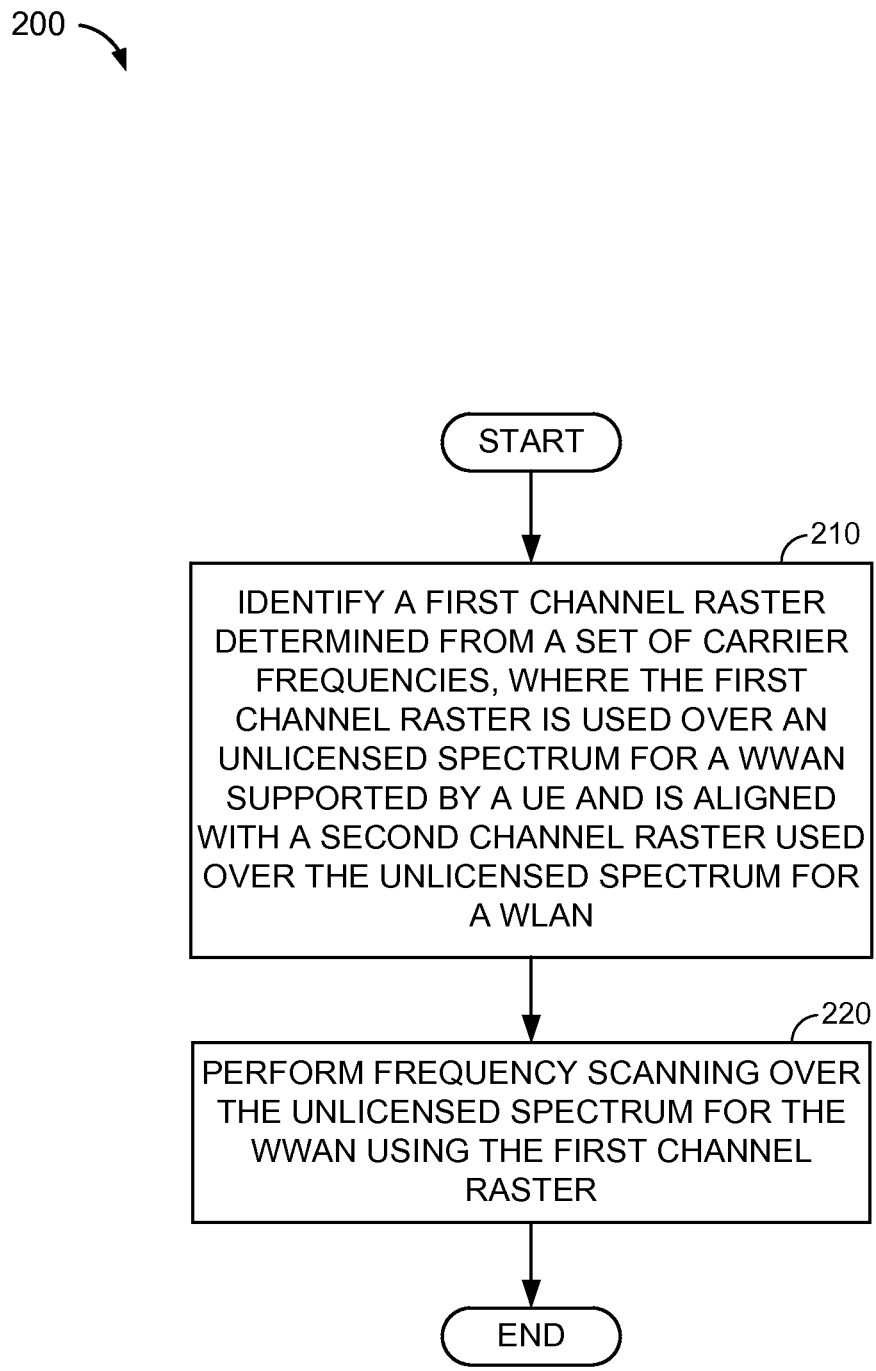
FIGS. 2 and 3 are flow diagrams illustrating an example method of frequency scanning over the unlicensed spectrum in a UE and a network entity, respectively, in accordance with various aspects of the present disclosure.

Referring to FIG. 2, an example of one or more operations of an aspect of channel raster component 125 (FIG. 1A) according to the present apparatus and methods are described with reference to one or more methods and one or more components that may perform the actions of these methods. Although the operations described below are presented in a particular order and/or as being performed by an example component, it should be understood that the ordering of the actions and the components performing the actions may be varied, depending on the implementation. Also, although the channel raster component 125 is illustrated as having a number of subcomponents, it should be understood that one or more of the illustrated subcomponent may be separate from, but in communication with, the channel raster component 125 and/or each other. Moreover, it should be understood that the following actions or components described with respect to the channel raster component 125 and/or its subcomponents may be performed by a specially-programmed processor, a processor executing specially-programmed software or computer-readable media, or by any other combination of a hardware component and/or a software component specially configured for performing the described actions or components.

In an aspect, at block 210, method 200 includes identifying a first channel raster determined from a set of carrier frequencies, where the first channel raster is used over an unlicensed spectrum for a WWAN supported by a UE and is aligned with a second channel raster used over the unlicensed spectrum for a WLAN. In an aspect, for example, UE 115, may execute channel raster component 125 (FIG. 1A) and/or a identifying component 126 to identify a first channel raster 128 determined from a set of carrier frequencies 131, where the first channel raster 128 is used over an unlicensed spectrum for a WWAN 132 supported by a UE 115 and is aligned with a second channel raster 129 used over the unlicensed spectrum for a WLAN.

In an aspect, at block 220, method 200 includes performing frequency scanning over the unlicensed spectrum for the WWAN using the first channel raster. In an aspect, for example, UE 115, may execute channel raster component 125 (FIG. 1A) and/or scanning component 127 to perform frequency scanning over the unlicensed spectrum for the WWAN 132 using the first channel raster 128.

Figure 3:
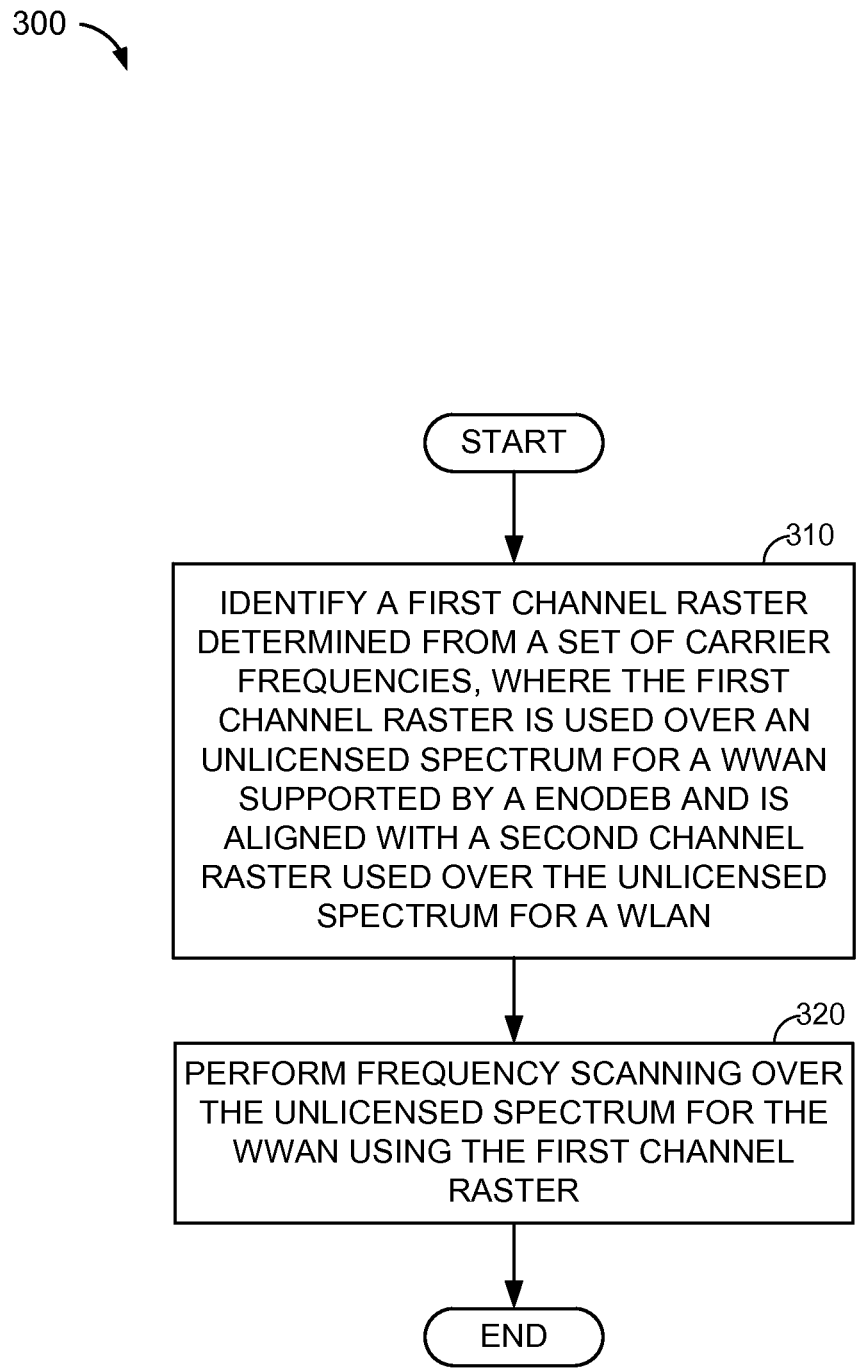

Referring to FIG. 3, an example of one or more operations and/or of an aspect of channel raster component 135 (FIG. 1B) according to the present apparatus and methods are described with reference to one or more methods and one or more components that may perform the actions of these methods. Although the operations described below are presented in a particular order and/or as being performed by an example component, it should be understood that the ordering of the actions and the components performing the actions may be varied, depending on the implementation. Also, although the channel raster component 135 is illustrated as having a number of subcomponents, it should be understood that one or more of the illustrated subcomponent may be separate from, but in communication with, the channel raster component 135 and/or each other. Moreover, it should be understood that the following actions or components described with respect to the channel raster component 135 and/or its subcomponents may be performed by a specially-programmed processor, a processor executing specially-programmed software or computer-readable media, or by any other combination of a hardware component and/or a software component specially configured for performing the described actions or components.

In an aspect, at block 310, method 300 includes identifying a first channel raster determined from a set of carrier frequencies, where the first channel raster is used over an unlicensed spectrum for a WWAN supported by a network entity and is aligned with a second channel raster used over the unlicensed spectrum for a WLAN. In an aspect, for example, network entity 120, may execute channel raster component 135 (FIG. 1B) and/or a identifying component 136 to identify a first channel raster 138 determined from a set of carrier frequencies 141, where the first channel raster 138 is used over an unlicensed spectrum for a WWAN 142 supported by a network entity 120 and is aligned with a second channel raster 139 used over the unlicensed spectrum for a WLAN.

In an aspect, at block 320, method 300 includes performing frequency scanning over the unlicensed spectrum for the WWAN using the first channel raster. In an aspect, for example, network entity 120, may execute channel raster component 135 (FIG. 1B) and/or scanning component 137 to perform frequency scanning over the unlicensed spectrum for the WWAN 142 using the first channel raster 138.

Figure 4:
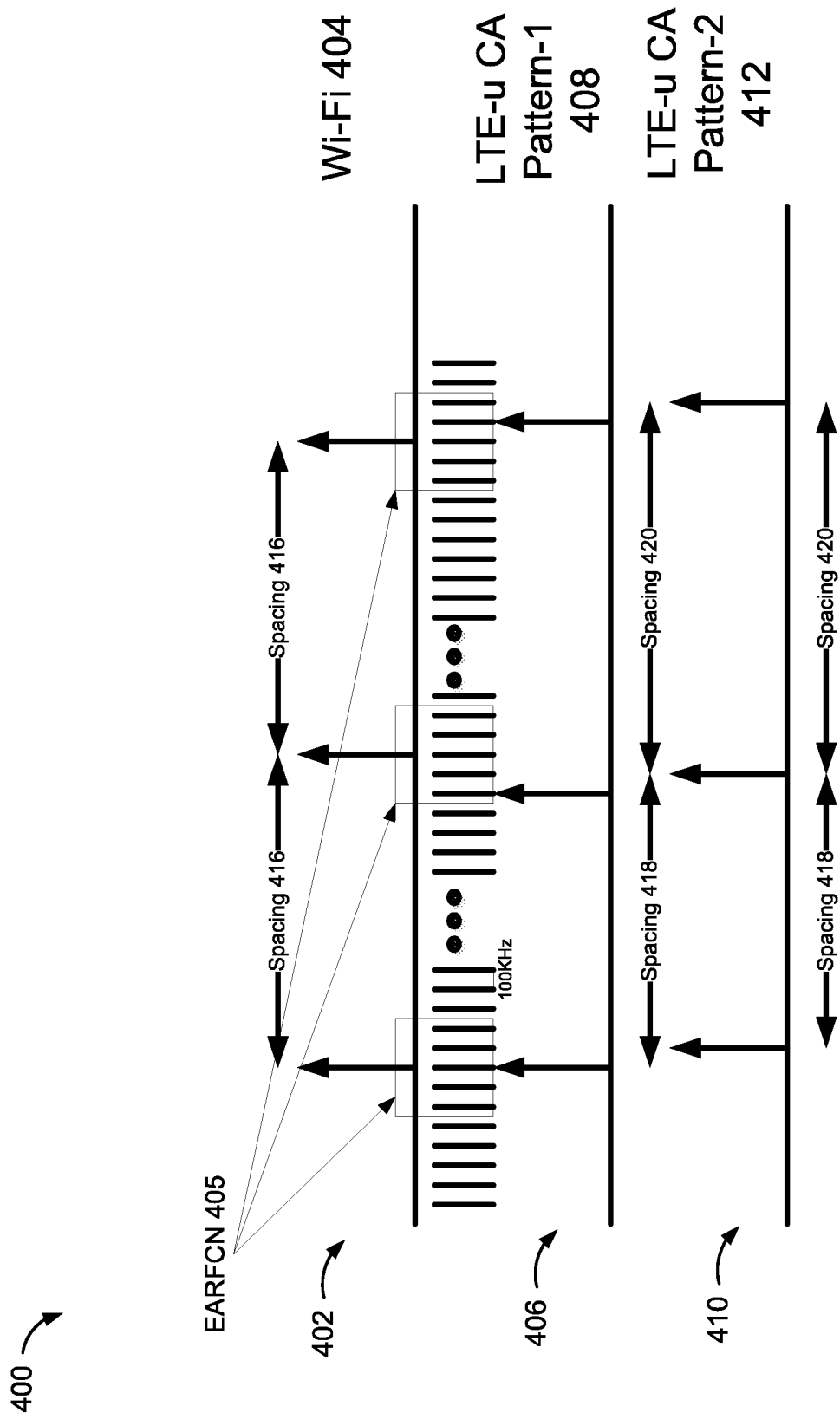
FIG. 4 is a diagram illustrating an example of the structured channel rasters for frequency scanning in the unlicensed spectrum in accordance with various aspects of the present disclosure.

FIG. 4 illustrates a diagram 400 having examples of structured channel rasters established based on expressions (1) and/or (2). For example, in an aspect, the structured channel rasters 402, 406, and 410 may correspond to one or more channel rasters of FIGS. 1A and/or 1B (e.g., first channel rasters 128/138). With regard to Wi-Fi 404, channel raster 402 may have a spacing 416 between EARFCNs 405. In certain aspects, spacing 416 may correspond to 20 MHz.

In another aspect, LTE in unlicensed spectrum CA Pattern-1 408 and LTE in unlicensed spectrum CA Pattern-2 412 may include channel rasters 406 and 410, respectively, along with spacing 418 and 420. Spacings 418 and 420 may correspond to 19.8 MHz and 20.1 MHz, respectively. Moreover, multiple channel raster patterns (e.g., channel rasters 406 and 410) are shown for LTE over unlicensed spectrum (e.g., Pattern-1 408 and Pattern-2 412), which are determined from subsets of carrier frequencies (e.g., subsets of the set of carrier frequencies 131/141 of FIGS. 1A/1B), some of which are aligned with or surrounding each of the carrier frequencies in the channel raster 402 of Wi-Fi 404 in that they occur at or substantially close to the center frequency of the each of EARFCN 405. The various aspects of structured channel rasters for unlicensed spectrum described herein may be based at least on the examples illustrated in FIG. 4 and other similar examples.

Figure 5:
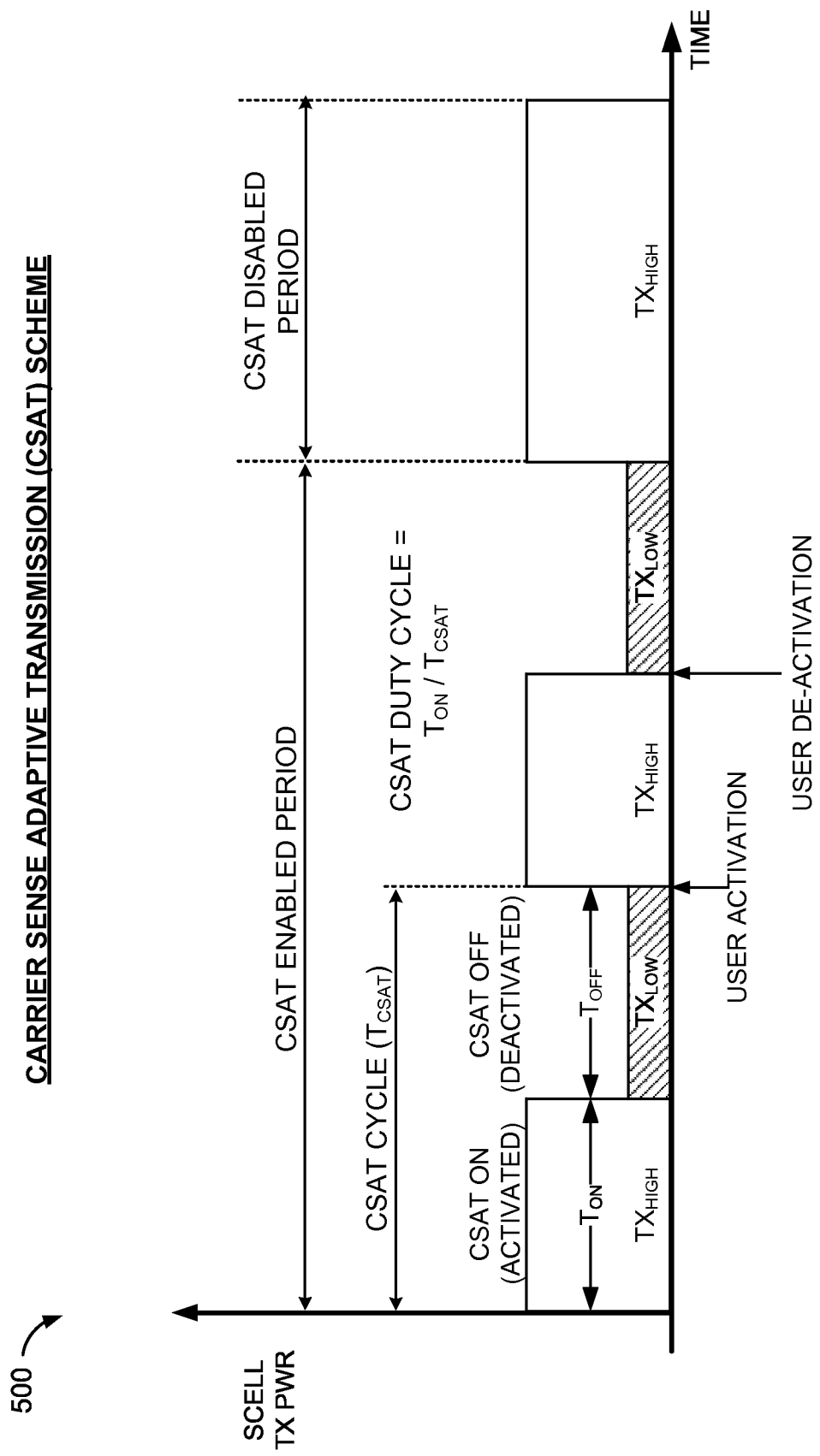
FIG. 5 is a diagram illustrating certain aspects of a Carrier Sense Adaptive Transmission (CSAT) communication scheme for cycling cellular operation in accordance with a long-term Time Division Multiplexed (TDM) communication pattern in accordance with various aspects of the present disclosure.

FIG. 5 shows a diagram 500 that illustrates certain aspects a Carrier Sensing and Adaptive Transmission (CSAT) communication scheme for cycling cellular operation in accordance with a long-term TDM communication pattern. CSAT may be selectively enabled on one or more SCells (e.g., network entity 120 of FIG. 1A/1B) as appropriate to facilitate co-existence in unlicensed spectrum, even when a clean channel free of competing RAT operation is not available. In particular, in the event that no clean channel is available, CSAT is used to apply adaptive TDM transmission to LTE in the unlicensed spectrum small cells, based on long-term carrier sensing of co-channel Wi-Fi activities. CSAT ensures that even in very dense deployments, LTE in unlicensed spectrum network entities can share the channel fairly with the neighboring WiFi network entities.

When enabled, SCell operation is cycled between CSAT ON (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time $T_{ON}$, SCell transmission on the unlicensed band may proceed at a normal, relatively high transmission power. During an associated deactivated period of time $T_{OFF}$, however, the SCell remains in a configured state but transmission on the unlicensed band is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$), cycle timing (e.g., the start/stop time of each CSAT cycle), and the relative transmission powers during activated/deactivated periods, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel. Conversely, if utilization of a given channel by Wi-Fi devices is low, an LTE radio may adjust one or more of the CSAT parameters such that usage of the channel by the LTE radio is increased. For example, the LTE radio may increase its transmit duty cycle or transmit power on the channel. In either case, the CSAT ON (activated) periods may be made sufficiently long (e.g., greater than or equal to about 200 msec) to provide user devices with a sufficient opportunity to perform at least one measurement during each CSAT ON (activated) period.

A CSAT scheme as provided herein may offer several advantages for mixed RAT co-existence, particular in unlicensed spectrum. For example, by adapting communication based on signals associated with a WLAN (e.g., Wi-Fi), a WWAN (e.g., LTE) may react to utilization of a co-channel by devices that use the first RAT while refraining from reacting to extraneous interference by other devices (e.g., non-Wi-Fi devices) or adjacent channels. As another example, a CSAT scheme enables a device that uses one RAT to control how much protection is to be afforded to co-channel communications by devices that use another RAT by adjusting the particular parameters employed. In addition, such a scheme may be generally implemented without changes to the underlying RAT communication protocol. In an LTE system, for example, CSAT may be generally implemented without changing the LTE PHY or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON,min}$) and a minimum CSAT OFF (deactivated) period ($T_{OFF,min}$). Accordingly, the CSAT ON (activated) period durations and transmission powers may be different, but minimum deactivation times and certain channel selection measurement gaps may be synchronized.

Figure 6:
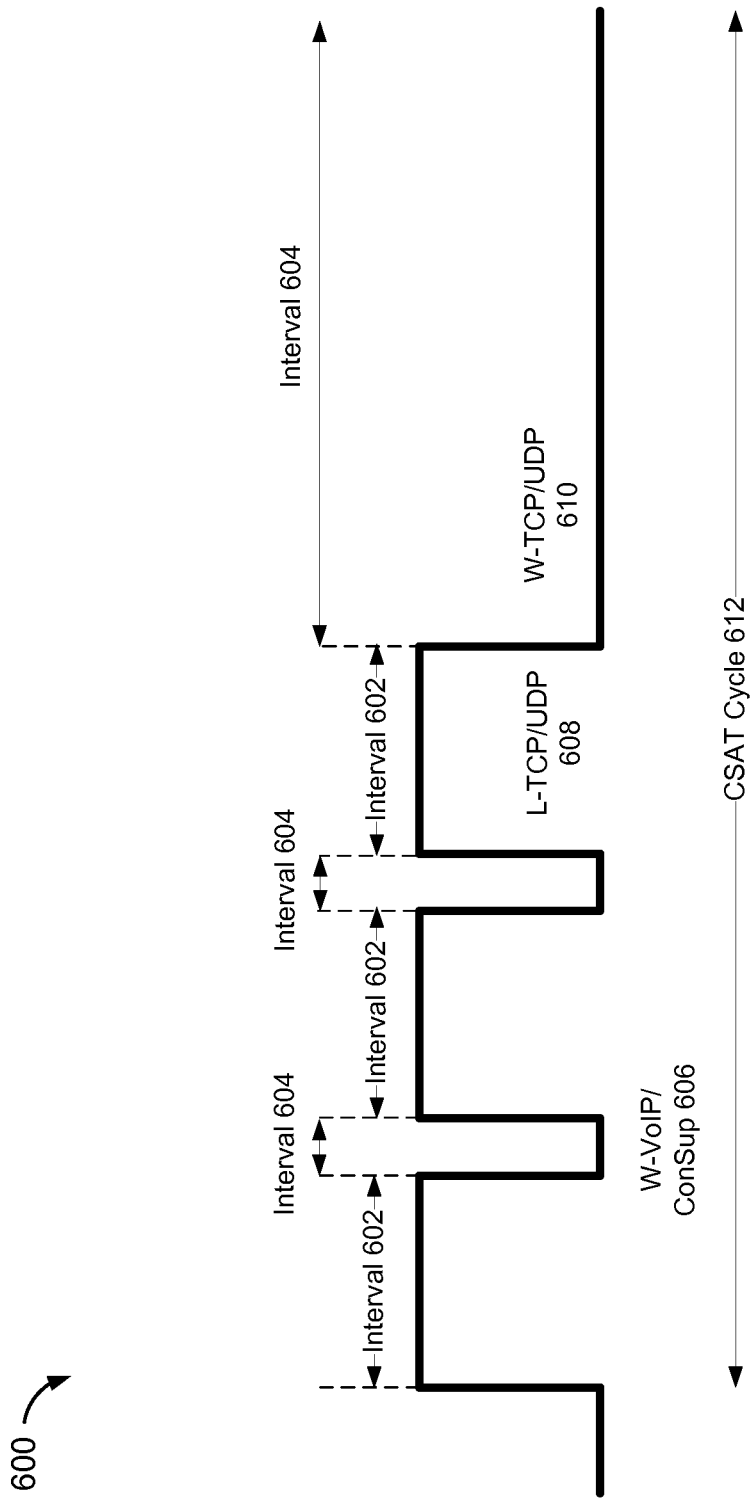
FIG. 6 is a diagram illustrating an example scenario for using structure channel rasters during a CSAT cycle in accordance with various aspects of the present disclosure.

FIG. 6 illustrates an example scenario 600 for using structured channel rasters during a CSAT cycle as described above with respect to FIG. 5. For example, the structured channel rasters may correspond to one or more channel rasters of FIGS. 1A and/or 1B (e.g., first channel rasters 128/138) and/or channel rasters 402, 406, and 412 of FIG. 4. In an aspect, scenario 600 includes interval 602 corresponding to the time period of LTE-Transmission Control Protocol/User Datagram Protocol (L-TCP/UDP) channel raster 608 during the CSAT cycle 612 which may correspond to the CSAT cycle ($T_{CSAT}$) described in FIG. 5. In an instance, the interval 602 may have a length of 10 milliseconds. Moreover, scenario 600 may include WWAN-Voice over Internet Protocol (W-VoIP/ConSup) 606 with an interval 604. In certain instances, interval 604 may have a length ranging from one (1) to two (2) milliseconds. Furthermore, CSAT cycle 612 may include W-TCP/UDP 610 which may occur after L-TCP/UDP 608.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for frequency scanning during wireless communication, comprising:
   identifying a first channel raster pattern determined from a set of carrier frequencies, the set of carrier frequencies including multiple subsets of carrier frequencies, each subset of the multiple subsets of carrier frequencies being centered around a carrier frequency in a second channel raster, the first channel raster pattern being used over an unlicensed spectrum for a wireless wide area network (WWAN), corresponding to a first channel raster for the WWAN, wherein the first channel raster pattern has a channel spacing for intra-band carrier aggregation and is aligned with the second channel raster, different from the first channel raster, being used over the unlicensed spectrum for a wireless local area network (WLAN), wherein alignment of the second channel raster occurs at a center frequency of at least one Evolved Universal Terrestrial Radio Access (E-UTRA) Absolute Radio Frequency Channel Number (EARFCN) of the first channel raster pattern in the unlicensed spectrum, and wherein each of the first channel raster and the second channel raster establish a respective integer multiple for frequency steps on the unlicensed spectrum; and performing the frequency scanning over the unlicensed spectrum for the WWAN using the first channel raster pattern.

2. The method of claim 1, wherein the first channel raster pattern is used over the unlicensed spectrum for the WWAN supported by a user equipment (UE) or a network entity.

3. The method of claim 1, wherein the WWAN includes a Long Term Evolution (LTE) network.

4. The method of claim 1, wherein the WLAN includes a Wi-Fi network.

5. The method of claim 1, wherein:
each subset of the multiple subsets of carrier frequencies has a same number of carrier frequencies as each other subset,
the carrier frequencies within each subset are equally spaced, and
the first channel raster pattern includes only carrier frequencies selected from the multiple subsets of carrier frequencies.

6. The method of claim 5, wherein the number of carrier frequencies in a subset is five (5) and a spacing between carrier frequencies in a subset is 100 kHz.

7. The method of claim 1, wherein for downlink operations, the first channel raster pattern includes only carrier frequencies determined based on the following expression:

$$F_{DL} = F_{DL\_low} + 20 \times \text{floor}\left(\frac{N_{DL} - N_{Offs\_DL}}{5}\right) + 0.1 \times \text{rem}(N_{DL} - N_{Offs\_DL}, 5)$$

where $F_{DL\_low}$ is a starting carrier frequency, $N_{DL}$ is a respective EARFCN, and $N_{Offset\_DL}$ is a starting EARFCN.

8. An apparatus for frequency scanning during wireless communication, comprising:
means for identifying a first channel raster pattern determined from a set of carrier frequencies, the set of carrier frequencies including multiple subsets of carrier frequencies, each subset of the multiple subsets of carrier frequencies being centered around a carrier frequency in a second channel raster, the first channel raster pattern being used over an unlicensed spectrum for a wireless wide area network (WWAN), corresponding to a first channel raster for the WWAN, wherein the first channel raster pattern has a channel spacing for intra-band carrier aggregation and is aligned with the second channel raster, different from the first channel raster, being used over the unlicensed spectrum for a wireless local area network (WLAN), wherein alignment of the second channel raster occurs at a center frequency of at least one Evolved Universal Terrestrial Radio Access (E-UTRA) Absolute Radio Frequency Channel Number (EARFCN) of the first channel raster pattern in the unlicensed spectrum, and wherein each of the first channel raster and the second channel raster establish a respective integer multiple for frequency steps on the unlicensed spectrum; and
means for performing the frequency scanning over the unlicensed spectrum for the WWAN using the first channel raster pattern.

9. The apparatus of claim 8, wherein the first channel raster pattern is used over the unlicensed spectrum for the WWAN supported by a user equipment (UE) or a network entity.

10. The apparatus of claim 8, wherein for downlink operations, the first channel raster pattern includes only carrier frequencies determined based on the following expression:

$$F_{DL} = F_{DL\_low} + 20 \times \text{floor}\left(\frac{N_{DL} - N_{Offs\_DL}}{5}\right) + 0.1 \times \text{rem}(N_{DL} - N_{Offs\_DL}, 5)$$

where $F_{DL\_low}$ is a starting carrier frequency, $N_{DL}$ is a respective EARFCN, and $N_{Offset\_DL}$ is a starting EARFCN.

11. A non-transitory computer-readable medium storing computer executable code for frequency scanning during wireless communication, comprising:
code for identifying a first channel raster pattern determined from a set of carrier frequencies, the set of carrier frequencies including multiple subsets of carrier frequencies, each subset of the multiple subsets of carrier frequencies being centered around a carrier frequency in a second channel raster, the first channel raster pattern being used over an unlicensed spectrum for a wireless wide area network (WWAN), corresponding to a first channel raster for the WWAN, wherein the first channel raster pattern has a channel spacing for intra-band carrier aggregation and is aligned with the second channel raster, different from the first channel raster, being used over the unlicensed spectrum for a wireless local area network (WLAN), wherein alignment of the second channel raster occurs at a center frequency of at least one Evolved Universal Terrestrial Radio Access (E-UTRA) Absolute Radio Frequency Channel Number (EARFCN) of the first channel raster pattern in the unlicensed spectrum, and wherein each of the first channel raster and the second channel raster establish a respective integer multiple for frequency steps on the unlicensed spectrum; and
code for performing the frequency scanning over the unlicensed spectrum for the WWAN using the first channel raster pattern.

12. The non-transitory computer-readable medium of claim 11, wherein the first channel raster pattern is used over the unlicensed spectrum for the WWAN supported by a user equipment (UE) or a network entity.

13. The non-transitory computer-readable medium of claim 11, wherein for downlink operations, the first channel raster pattern includes only carrier frequencies determined based on the following expression:

$$F_{DL} = F_{DL\_low} + 20 \times \text{floor}\left(\frac{N_{DL} - N_{Offs\_DL}}{5}\right) + 0.1 \times \text{rem}(N_{DL} - N_{Offs\_DL}, 5)$$

where $F_{DL\_low}$ is a starting carrier frequency, $N_{DL}$ is a respective EARFCN, and $N_{Offset\_DL}$ is a starting EARFCN.

14. An apparatus for frequency scanning during wireless communication, comprising:
  a transceiver;
  a memory configured to store data; and
  one or more processors communicatively coupled with the transceiver and the memory via at least one bus, wherein the one or more processors and the memory are configured to:
    identify a first channel raster pattern determined from a set of carrier frequencies, the set of carrier frequencies including multiple subsets of carrier frequencies, each subset of the multiple subsets of carrier frequencies being centered around a carrier frequency in a second channel raster, the first channel raster pattern being used over an unlicensed spectrum for a wireless wide area network (WWAN), corresponding to a first channel raster for the WWAN, wherein the first channel raster pattern has a channel spacing for intra-band carrier aggregation and is aligned with the second channel raster, different from the first channel raster, being used over the unlicensed spectrum for a wireless local area network (WLAN), wherein alignment of the second channel raster occurs at a center frequency of at least one Evolved Universal Terrestrial Radio Access (E-UTRA) Absolute Radio Frequency Channel Number (EARFCN) of the first channel raster pattern in the unlicensed spectrum, and wherein each of the first channel raster and the second channel raster establish a respective integer multiple for frequency steps on the unlicensed spectrum, and
    perform, via the transceiver, the frequency scanning over the unlicensed spectrum for the WWAN using the first channel raster pattern.

15. The apparatus of claim 14, wherein the first channel raster pattern is used over the unlicensed spectrum for the WWAN supported by a user equipment (UE) or a network entity.

16. The apparatus of claim 14, wherein the WWAN includes a Long Term Evolution (LTE) network.

17. The apparatus of claim 14, wherein the WLAN includes a Wi-Fi network.

18. The apparatus of claim 14, wherein:
  each subset of the multiple subsets of carrier frequencies has a same number of carrier frequencies as each other subset,
  the carrier frequencies within each subset are equally spaced, and
  the first channel raster pattern includes only carrier frequencies selected from the multiple subsets of carrier frequencies.

19. The apparatus of claim 18, wherein the number of carrier frequencies in a subset is five (5) and a spacing between carrier frequencies in a subset is 100 kHz.

20. The apparatus of claim 14, wherein for downlink operations, the first channel raster pattern includes only carrier frequencies determined based on the following expression:

$$F_{DL} = F_{DL\_low} + 20 \times \text{floor}\left(\frac{N_{DL} - N_{Offs\_DL}}{5}\right) + 0.1 \times \text{rem}(N_{DL} - N_{Offs\_DL}, 5)$$

where $F_{DL\_low}$ is a starting carrier frequency, $N_{DL}$ is a respective EARFCN, and $N_{Offset\_DL}$ is a starting EARFCN.

21. The method of claim 1, wherein the intraband carrier aggregation corresponds to intra-band contiguous carrier aggregation having a spacing between channels that is an integer multiple of 300 kHz.

22. The apparatus of claim 8, wherein the intraband carrier aggregation corresponds to intra-band contiguous carrier aggregation having a spacing between channels that is an integer multiple of 300 kHz.

23. The non-transitory computer-readable medium of claim 11, wherein the intraband carrier aggregation corresponds to intra-band contiguous carrier aggregation having a spacing between channels that is an integer multiple of 300 kHz.

24. The apparatus of claim 14, wherein the intraband carrier aggregation corresponds to intra-band contiguous carrier aggregation having a spacing between channels that is an integer multiple of 300 kHz.

25. The method of claim 1, further comprising:
  determining a second channel raster pattern from the set of carrier frequencies to be used over the unlicensed spectrum for the WWAN,
  wherein the second channel raster pattern has a second channel spacing for carrier aggregation and is different from the first channel raster pattern; and
  performing the frequency scanning over the unlicensed spectrum for the WWAN using the second channel raster pattern.

26. The method of claim 25, wherein the first channel raster pattern is offset from the second channel raster pattern.

27. The apparatus of claim 8, wherein:
  the means for identifying is configured to determine a second channel raster pattern that has a second channel spacing for carrier aggregation and is different from the first channel raster pattern; and
  the means for performing the frequency scanning is configured to perform frequency scanning over the unlicensed spectrum for the WWAN using the second channel raster pattern.

28. The non-transitory computer-readable medium of claim 11, further comprising code to:
  determine a second channel raster pattern from the set of carrier frequencies to be used over the unlicensed spectrum for the WWAN,
  wherein the second channel raster pattern has a second channel spacing for carrier aggregation and is different from the first channel raster pattern; and
  perform the frequency scanning over the unlicensed spectrum for the WWAN using the second channel raster pattern.

29. The apparatus of claim 14, wherein the one or more processors and the memory are configured to:
  determine a second channel raster pattern from the set of carrier frequencies to be used over the unlicensed spectrum for the WWAN,
  wherein the second channel raster pattern has a second channel spacing for carrier aggregation and is different from the first channel raster pattern; and perform the frequency scanning over the unlicensed spectrum for the WWAN using the second channel raster pattern.

30. The apparatus of claim 29, wherein the first channel raster pattern is offset from the second channel raster pattern.

\* \* \* \* \*